INVENTOR:
JOHN C. EATON
BY
Porter, Chittick & Russell
ATTORNEYS.

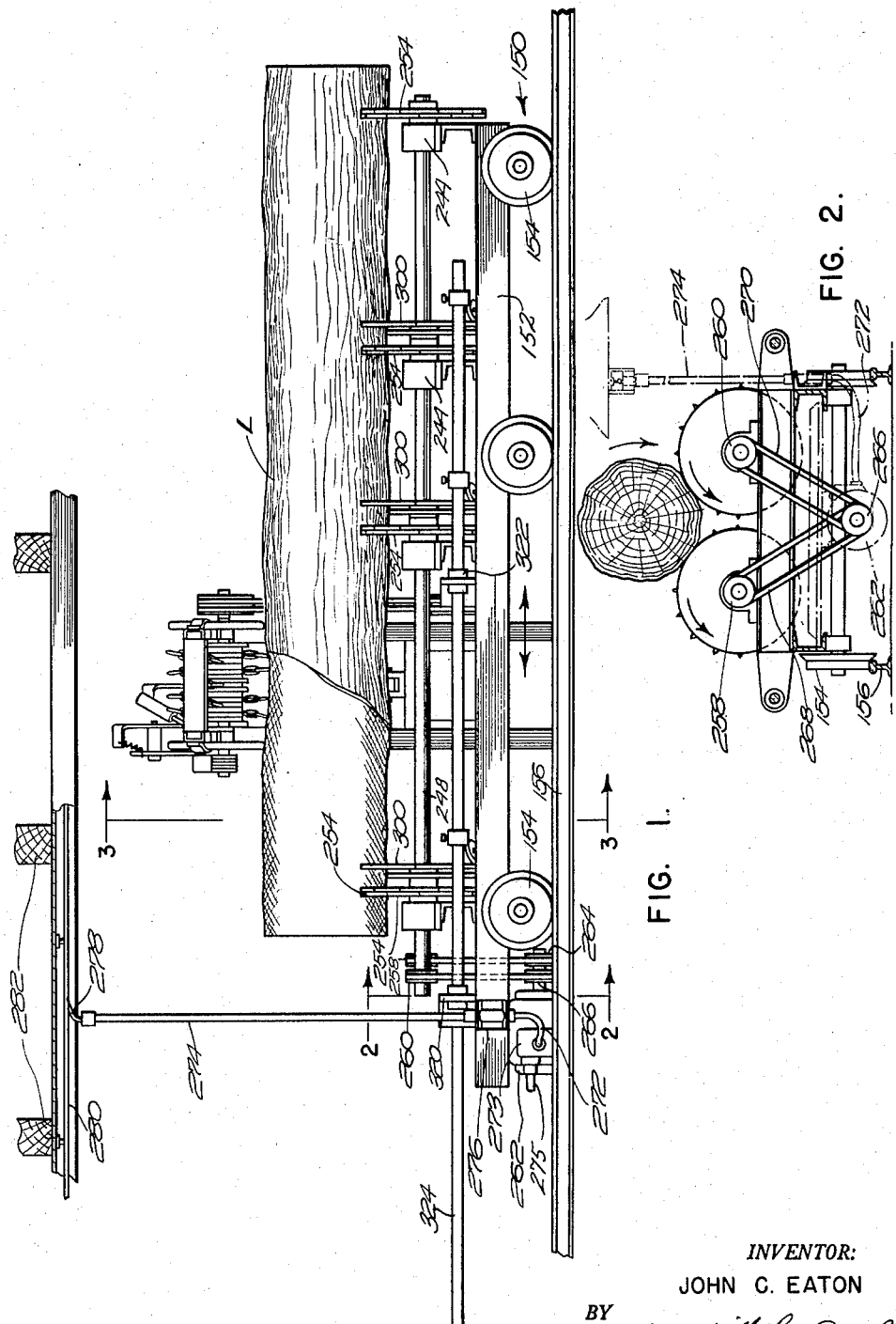

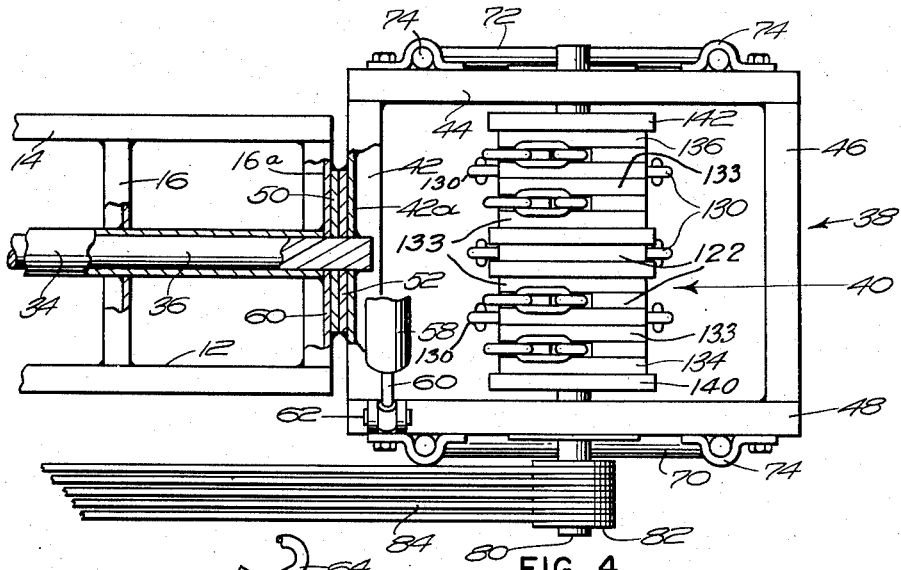
FIG. 4.
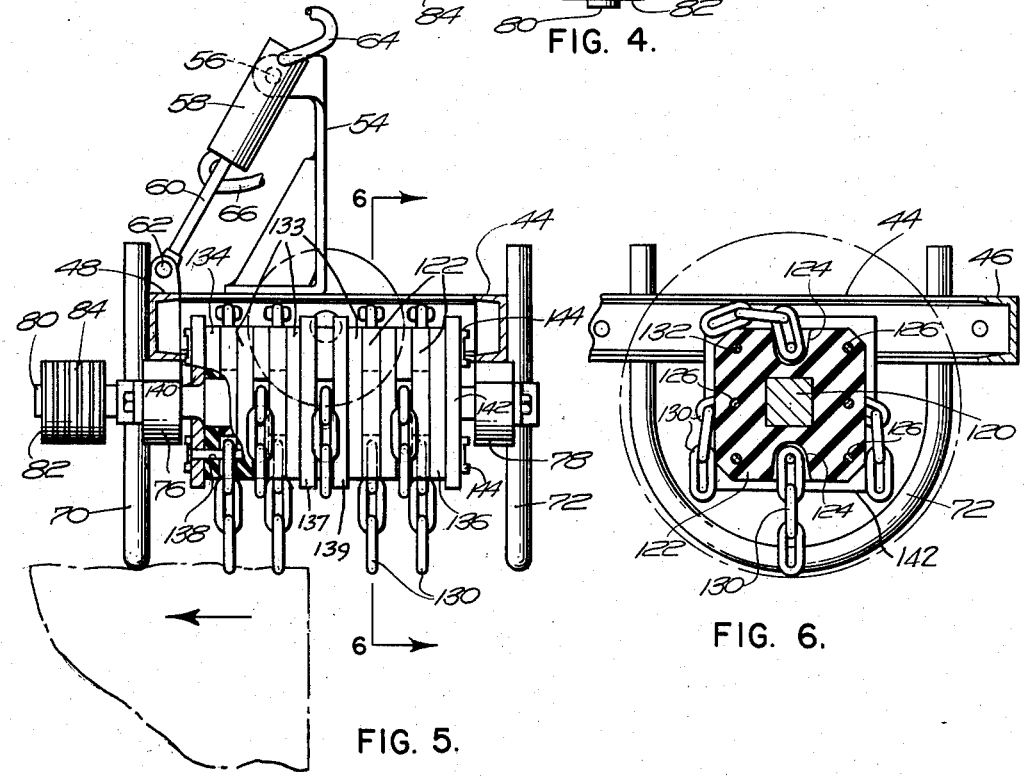
FIG. 5.
FIG. 6.
INVENTOR:
JOHN C. EATON
BY
Porter, Chittick & Russell
ATTORNEYS.

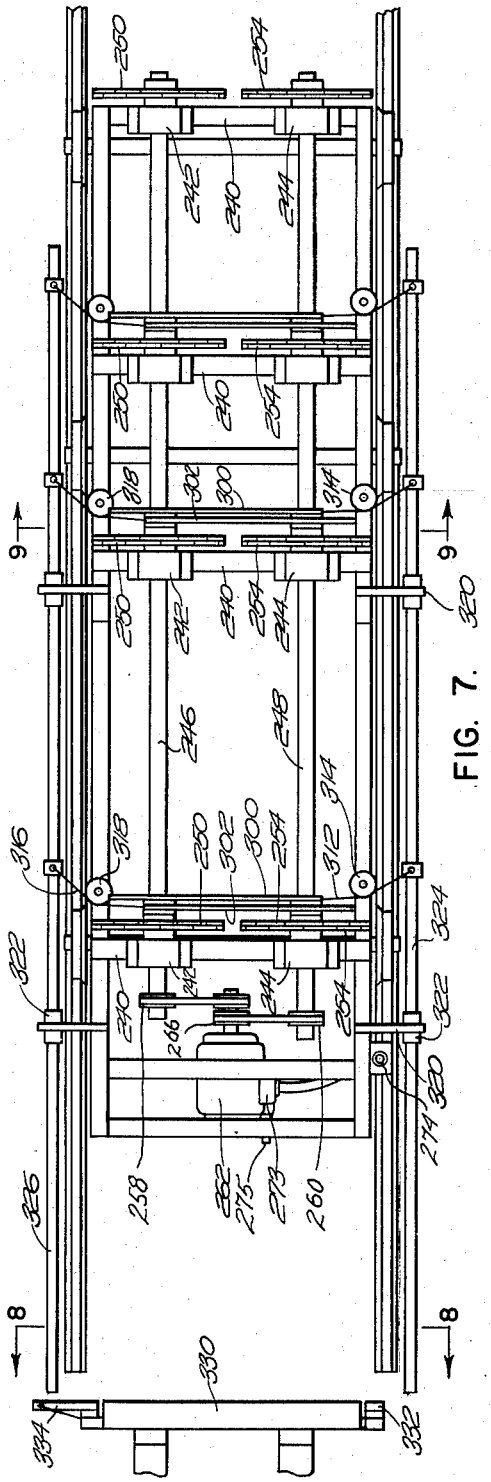
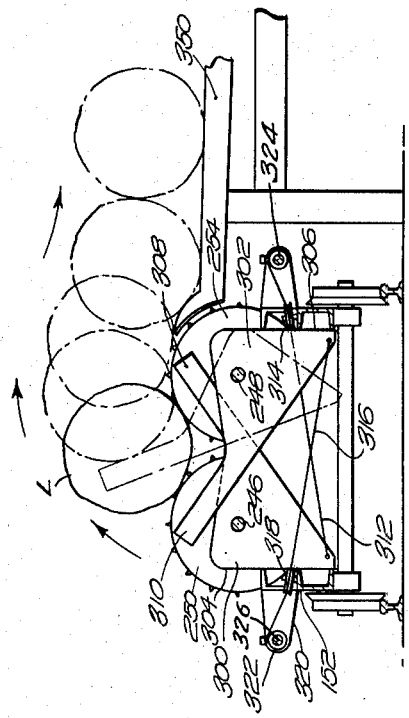
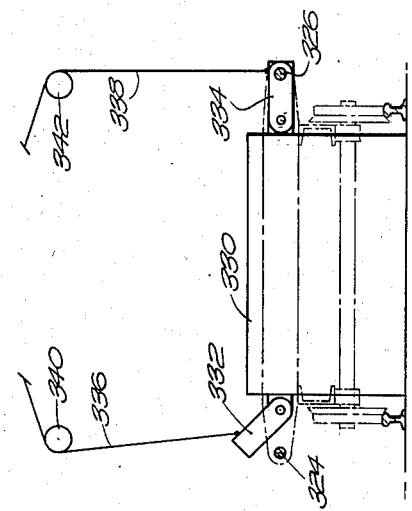

Aug. 25, 1959  J. C. EATON  2,901,011
CHAIN-TYPE DEBARKING FLAILS CUSHIONED BY RUBBER
PLATES COAXIALLY MOUNTED ON A ROTOR SHAFT
Filed April 24, 1956  5 Sheets-Sheet 5

INVENTOR:
JOHN C. EATON
BY
Porter, Chittick & Russell
ATTORNEYS.

United States Patent Office

2,901,011
Patented Aug. 25, 1959

2,901,011

CHAIN-TYPE DEBARKING FLAILS CUSHIONED BY RUBBER PLATES COAXIALLY MOUNTED ON A ROTOR SHAFT

John C. Eaton, Rochester, Vt.

Application April 24, 1956, Serial No. 580,209

2 Claims. (Cl. 144—208)

This invention relates to a machine for peeling bark from logs.

One object of this invention is to provide a machine for debarking logs of different sizes.

A further object of this invention is to provide a log-peeling machine comprising an improved debarking mechanism that can be readily disassembled for maintenance and repair.

Another object of this invention is to provide a log-peeling machine characterized by an improved debarking mechanism of the flail-chain type, the chains being rubber-mounted in a rotatable head whereby to give the head a longer life of use than other flail-chain heads heretofore available.

Other objects, too numerous to be set forth individually, and many of the attendant advantages of this invention will be readily appreciated as the same becomes better understood by reference to the following detailed description when considered in connection with the accompanying drawings, wherein:

Fig. 1 is a side elevation of the machine with a log mounted in debarking position;

Fig. 2 is a vertical, transverse sectional view taken along line 2—2 of Fig. 1;

Fig. 4 is a fragmentary plan view, parts being broken away and shown in section, of the debarking mechanism comprising the flail head with its plurality of flail chains, means rotatably mounting the flail head, and means for rotating the flail head;

Fig. 5 is an end elevation looking from right to left at the mechanism shown in Fig. 4;

Fig. 6 is a vertical, transverse sectional view taken along line 6—6 of Fig. 5;

Fig. 7 is a plan view of the log carriage and the associated mechanism for removing a log from the carriage;

Fig. 8 is a vertical, transverse sectional view taken along line 8—8 of Fig. 7;

Fig. 9 is a vertical, transverse sectional view taken along line 9—9 of Fig. 7 and illustrating operation of the log-removing mechanism; and, Fig. 10 is a schematic view in perspective of the apparatus for selectively moving the carriage forward and backward.

Figure 3:
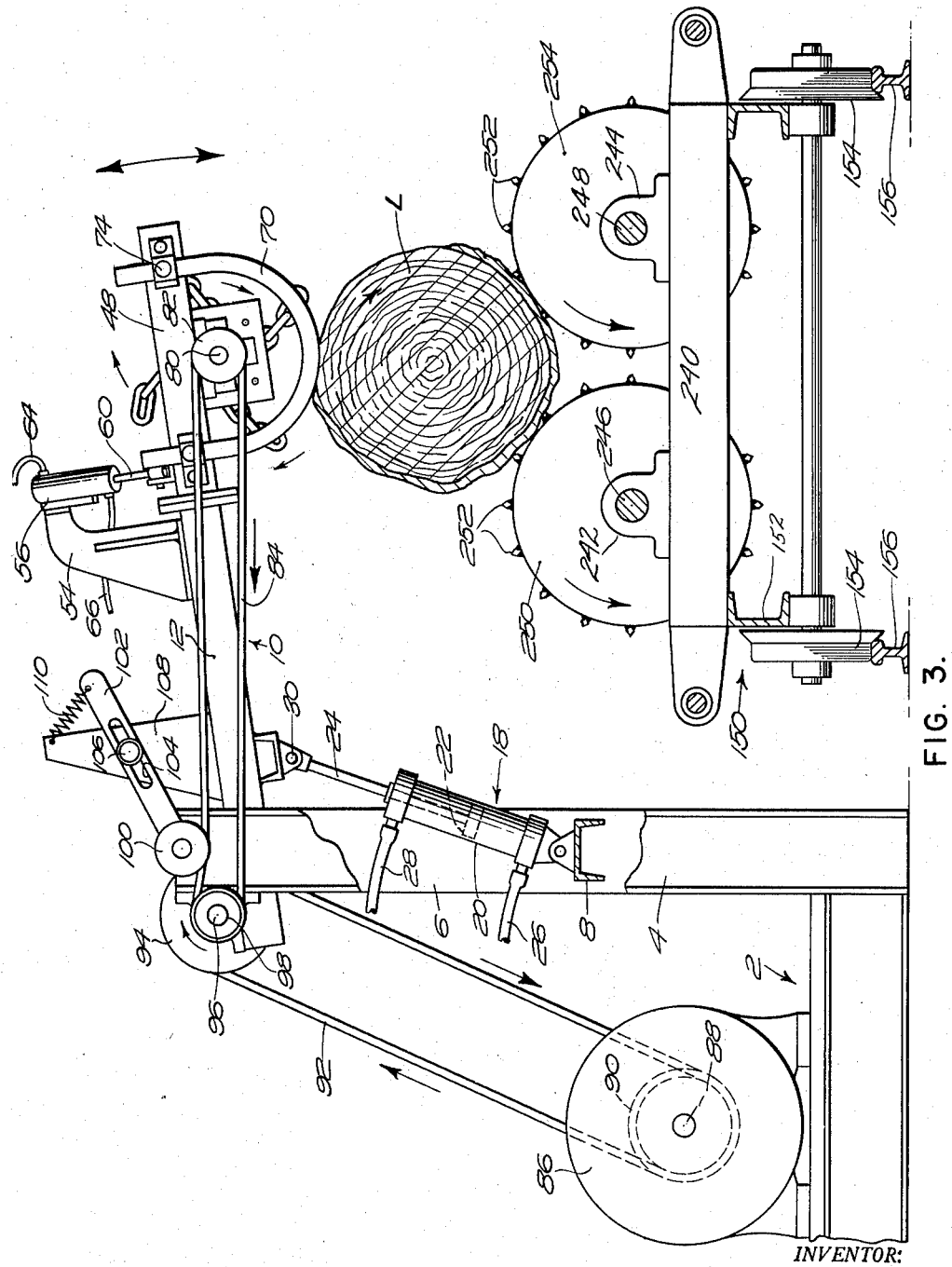
Fig. 3 is an enlarged vertical, transverse sectional view taken along line 3—3 of Fig. 1.

The present invention is best described as a combination comprising (1) means for supporting and operating a flail head, (2) a flail head, (3) a railway vehicle for carrying logs, (4) means for moving the vehicle back and forth on the railway, (5) means for rolling a log supported on the carriage, and (6) means for automatically unloading logs from the carriage upon completion of the debarking operation. Each of the afore-mentioned major parts of the combination are described hereinafter.

*Means for supporting and operating the flail head*

Figs. 1, 3 and 4–6 show this part of the machine. The structure comprises a platform 2 to which a pair of upright metal beams 4 and 6 of U-shaped cross section are secured by welding or rivets, as preferred. These upright beams are braced by a horizontal U-shaped metal beam 8. Pivotally secured to the upright beams 4 and 6 adjacent their upper ends is a frame 10 comprising a pair of parallel U-section bars 12 and 14 held together by a plurality of cross members 16 of identical cross section. The members 12, 14 and 16 are all welded together to provide a unitary structure. Pivotally attached to the upper side of horizontal beam 8 is a conventional fluid-pressure-responsive actuator 18 comprising a cylinder 20, a piston 22 positioned within the cylinder, and a piston rod 24. Pressure fluid from a suitable valve-controlled source (not shown) is applied to the casing via pressure lines 26 and 28. The outer end of piston rod 24 is pivotally secured at 30 to the frame 10. When fluid pressure is applied through the line 26, the frame 10 will be pivoted counter-clockwise as viewed in Fig. 3 to raise the flail head. When pressure is applied through the line 28, the frame 10 will be rotated in the opposite direction to lower the flail head. By suitably adjusting the pressures in lines 26 and 28, the frame 10 may be maintained at any desired position.

Welded to the cross members 16 is a cylindrical guide tube 34 within which is rotatably positioned a cylindrical shaft 36. The forward end of shaft 36 extends through a vertical wall 16a of the end cross member 16 and is attached to a rectangular frame 38 which carries a flail head 40 hereinafter described in detail. The frame 38 comprises four U-shaped bars 42, 44, 46 and 48 welded together at their ends. The shaft 36 extends through and is welded to a vertical wall 42a of the bar 42. Two circular bearing plates 50 and 52 whose facing surfaces are machined so as to slip freely relative to each other are welded to the end cross member 16 and bar 42 respectively. Secured to the top of frame 10 is a bracket 54 which acts to pivotally support at 56 a second fluid-pressure-responsive actuator 58 whose piston rod 60 is pivotally attached to the frame 38 at 62 as shown. Pressure lines 64 and 66 connect the actuator 58 to a valve-controlled source of fluid pressure (not shown). Fluid pressure in the line 64 acts to extend the piston rod 60 so that the flail-head frame 38 will rotate counterclockwise (as viewed in Fig. 5) a limited degree. When the fluid pressure in line 66 exceeds the pressure in line 64, the piston rod 60 is retracted to rotate the frame 38 in the opposite direction.

Two curved guide rods 70 and 72 are attached by removable clamps 74 to the members 44 and 48 of the frame 38. These rods serve several functions. First of all, by engaging a log L as it is being debarked, they prevent the flail head from dropping too far and make certain that only the free ends of the chains will strike the log. Secondly, they keep the log from bouncing when it is being rotated by apparatus hereinafter described. Since the guide rods 70 and 72 are curved, they do not impede rotation of the log when in engagement therewith.

Attached to the underside of elements 44 and 48 of the frame 38 are two bearing plates 76 and 78 which act as bearing supports for a rotatable shaft 80 of the flail head 40. The shaft 80 is provided with a pulley 82 which carries a plurality of belts 84.

A reversible motor 86 is securely mounted on the platform 2. An output shaft 88 of the motor carries a pulley 90 which drives a plurality of endless belts 92. The belts 92 drive a pulley 94 mounted on one end of a shaft 96 which is rotatably attached to and extends between the two upright beams 4 and 6. A small pulley 98 is attached to the other end of shaft 96 and acts to drive the belts 84. The motor 86 thus drives the flail-head shaft 80.

In order to maintain tension on the belts 84 when the frame 10 is moved up or down or when the frame 38 is rotated relative to the frame 10, there is provided an idler pulley 100 which is rotatably attached to one end of a lever arm 102. The arm 102 is provided with an elongated slot 104 through which extends a bolt or stub shaft 106 attached to a support 108 which is fixedly secured to the frame 10. A tension spring 110 is connected at one end to the support 108 and at the other end to the lever arm 102. The spring 110 acts to keep the idler pulley 100 in engagement with the belts 84. The slot 104 permits longitudinal movement of the lever arm 102 on the stub shaft 106 so as to vary the position of the pulley 100 relative to the stub shaft. This allows the pulley 100 to remain in engagement with the belts 84 when the frame 10 is lowered or raised.

The flail head

Although the ends of flail-head shaft 80 are rounded so as to rotate in the bearing plates 76 and 78, a substantial part 120 of the shaft 80 has a square or rectangular cross section (Figs. 5 and 6). A plurality of rubber plates 122, each provided with a square opening at its center, is mounted on the part 120 of shaft 80. Each plate 122 has two inwardly extending U-shaped slots 124 located at opposite side edges thereof.

Each rubber plate is also provided with six circular openings 126. Four of these are located at the corners; the other two are located adjacent the midpoints of the two opposite side edges having no slot 124.

The rubber plates are so positioned that the slots 124 of successive plates are displaced from each other by an angle of 90 degrees. In other words, the unslotted edge of one rubber plate is in alinement with the slotted edge of the next plate. Associated with the rubber plates is a plurality of chain lengths 130, each chain having an end link disposed in one of said slots 124. Extending through the slots 124 and openings 126 of the rubber plates are eight circular rods 132. These rods also extend through the end links of the chain lengths 130, thereby securing the chain lengths to the rubber plates.

Also mounted on the part 120 of shaft 80 is a plurality of rubber spacer plates 133. The end ones of these spacer plates are identified by numerals 134 and 136. These spacer plates have eight circular openings 138 which are positioned to coincide with the slots 124 and openings 126 of plates 122. In the illustrated embodiment the flail head comprises seven rubber plates 122. Mounted on the shaft 80 and bearing against opposite surfaces of the centrally located rubber plate 122, that is, the fourth plate, are two metal plates 137 and 139. These plates are provided with openings corresponding to the openings 126 in the rubber plates 122. Fitted on the rounded portions of shaft 80 in engagement with the spacer plates 134 and 136 are two end plates 140 and 142 respectively. These end plates are also perforated to receive the rods 132. The ends of these rods 132 are threaded to receive nuts 144 which act to draw all of the plates together and thus compact the elements of the flail head 40. The length of each chain is such that its free end extends slightly beyond the guide rods 70 and 72 when the chain is dangling straight down, as seen in Figs. 5 and 6. The width of slots 124 is great enough to permit limited rotation about the rod 132 of the end links positioned in the slots.

The railway vehicle and drive means therefor

Figure 10:
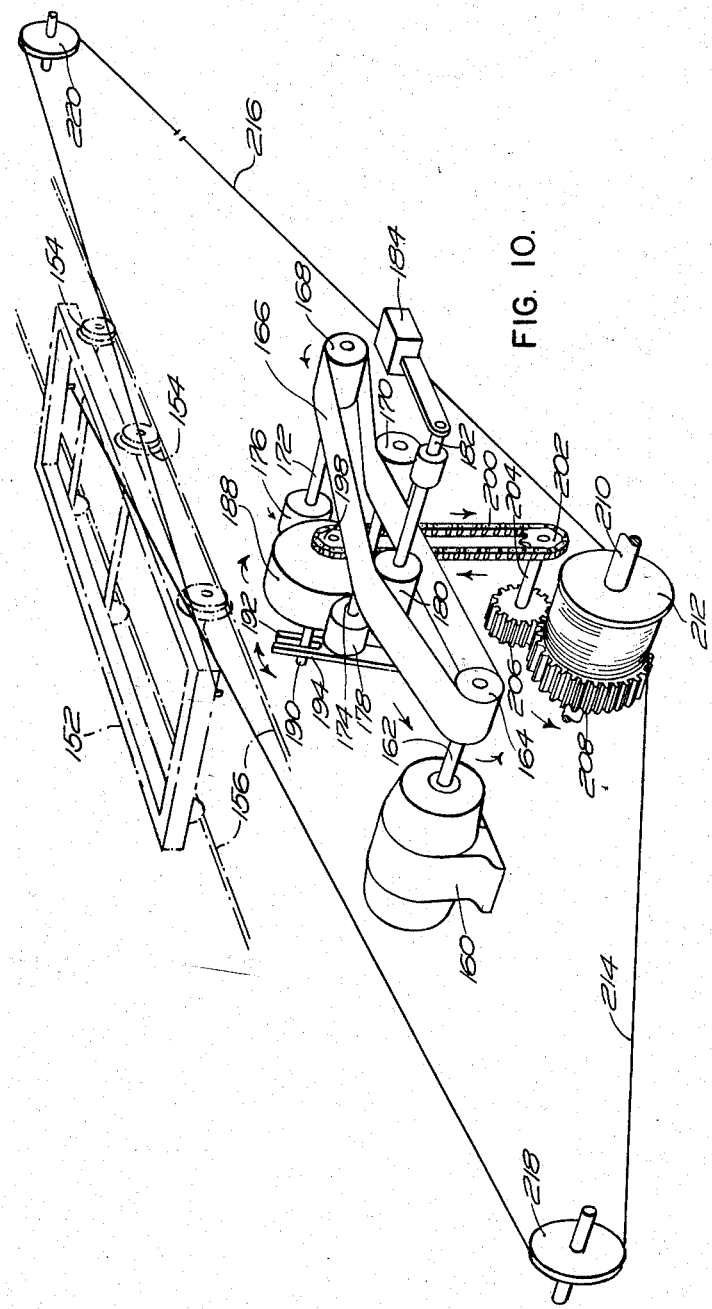

Logs are transported along beneath the flail head by means of a railway vehicle 150 which comprises a rectangular chassis 152 mounted on several pairs of wheels 154 which ride on tracks 156. The tracks are at ground level and run parallel to the front edge of platform 2. Positioned in an underground enclosure beneath the tracks is the apparatus for drawing the vehicle back and forth. This drive apparatus is schematically illustrated in Fig. 10 and comprises a motor 160 whose output shaft 162 is provided with a pulley 164 over which rides a wide flexible belt 166. The belt 166 rides around a first drive pulley 168 and over a second drive pulley 170. The pulley 168 is attached to one end of a rotatable shaft 172 which is journaled in a suitable fixed support (not shown). The pulley 170 is attached to a rotatable shaft 174 which is journaled in a similar suitable support (also not shown). At their opposite ends the shafts 172 and 174 are provided with friction driver rolls 176 and 178 respectively. A pulley 180 rotatably mounted on a shaft 182 attached to a bearing support (not shown) functions under the influence of a counterweight 184 to keep the belt 166 under tension, according to conventional practice.

Disposed between the friction rolls 176 and 178 is a large roll 188 mounted on a shaft 190 journaled in two pivoted supports (not shown). The shaft 190 extends through a slot 192 provided in an operating lever 194. It is to be understood that the lower end of lever 194 is pivotally secured to a suitable support (not shown) and that its upper end extends above the ground and is provided with a handle so that it may be grasped and moved by the operator. By moving the lever 194 in the direction of the roll 176 the operator causes the large roll 188 to come into engagement with the roll 176, whereupon the former will be driven by the latter in the direction shown by the arrows. When the operator moves the handle 194 in the opposite direction, the roll 188 moves away from the roll 176 into engagement with the roll 178, whereupon it will be rotated in the opposite direction. Attached to the shaft 190 is a sprocket gear 198 which drives a chain 200. The chain 200 drives a second sprocket 202 which acts through a shaft 204 and pinion gear 206 to drive a pinion gear 208. The latter gear is attached to a shaft 210 which carries a drum 212 fixed thereto. Attached to the drum 212 at different points are two cables 214 and 216. The cable 214 rides over a pulley 218 mounted adjacent the ground level at one end of the tracks. The cable 216 rides over a second pulley 220 located at the same level as the pulley 218, but at the opposite end of the tracks. The cable 214 extends beneath the chassis 152 of the railway vehicle and is attached to that end of the chassis nearest pulley 220. The cable 216 is similarly attached to the opposite end of chassis 152.

The railway vehicle is moved as follows: Assuming that the motor 160 is energized so as to drive the belt 166 in the direction shown by the arrows the vehicle will remain at rest so long as the roll 188 is out of engagement with both rolls 176 and 178. If now the lever 194 is moved so as to bring the roll 188 into engagement with the roll 176, the roll 188 will be driven in a clockwise direction. The pinion gear 206 will be driven in the same direction by the chain 200 and will thus drive the pinion 208 and the drum 212 in a counterclockwise direction. As this occurs the cable 214 will be wound up on the drum and the cable 216 will be unwound from the drum, thereby drawing the railway vehicle along the tracks toward the pulley 218. The vehicle will stop moving when the roll 188 is moved out of engagement with the roll 176. If then the roll 188 is caused to engage the roll 178, the vehicle will be drawn in the reverse direction toward the pulley 220.

*Means for rolling a log supported on the vehicle*

Looking now at Figs. 1, 2, 3 and 7, the carriage or vehicle 150 is provided with a plurality of transversely extending beams 240 welded or otherwise secured to the upper side of chassis 152. Each beam 240 is provided with a pair of bearings 242 and 244 which act to rotatably support a pair of shafts 246 and 248 respectively. Mounted on the shaft 246 is a plurality of rolls 250 each provided with a plurality of evenly spaced radially extending projections or teeth 252 on its peripheral or circumferential edge. The shaft 248 is provided with a like number of identical rolls 254 which also have teeth 252. A pair of pulleys 258 and 260 are carried by the shafts 246 and 248 at corresponding ends thereof. Secured to the underside of chassis 152 is a reversible motor 262 whose output shaft is provided with two identical pulleys 264 and 266. The pulley 264 is connected to the pulley 258 by means of a belt 268. The pulley 266 is connected to the pulley 260 by means of a belt 270. Power is supplied to the motor 262 by an electric cable 272. The cable 272 is connected to the motor through a switch box 273 which has a manually operated switch arm 275 adapted to change the connections to the motor so as to make it run at forward or reverse speed, as desired. The cable 272 leads to and into a metal conduit 274 which is attached to one side of the chassis 152 by means of a bracket 276. The cable 272 is connected to a flexible contact 278 attached to the top end of conduit 274. The contact 278 engages a third rail 280 which is attached to and supported by a suitable elevated structure 282. It is to be understood that the third rail 280 is alive with electrical current, being electrically connected to a generator or source of power (not shown).

In practice the rolls 250 and 254 serve two functions. First of all, they support a log L in position to be acted on by the flail head. Secondly, they rotate the log so that all of its bark will be exposed to the chain lengths of the flail head. It is believed apparent that the motor 262 drives both sets of rolls 250 and 254 in the same direction, which direction is the same as the direction of rotation of the pulleys 264 and 266 driven by the motor. Since the motor is reversible, the rolls 250 and 254 may be rotated either clockwise or counterclockwise as desired. As explained hereinafter, one reason for providing reversal of movement of the rolls 250 and 254 is to facilitate unloading of the logs upon completion of the debarking operation.

*Means for unloading logs from the vehicle*

In order to speed up production, provision has been made for automatically unloading logs from the vehicle after the debarking operation has been completed. The apparatus for accomplishing the unloading operation is illustrated in Figs. 1, 2, 3, 7, 8 and 9. Referring now to Figs. 1, 7 and 9 in particular, the vehicle 150 is provided with several pairs of log-ejector members 300 and 302. The ejector members 300 are rotatably mounted on the shaft 246. The ejector members 302 are rotatably mounted on the shaft 248. Fig. 9 shows one pair of the members 300 and 302 at rest and also shows the member 302 (outlined in dashed lines) in raised ejecting position. The members 300 and 302 are maintained in at-rest position by virtue of the engagement made by their side edges 304 and 306 with the chassis 152. The ejector members 300 are each provided with an extension or arm 308 which is in an inclined position as shown when the ejector members are at rest. The ejector members 302 are provided with similar arms 310. The arms 308 and 310 terminate short of the top of rolls 250 and 254 when the ejector members are at rest, thereby avoiding contact with a log L supported by the rollers.

Attached to the bottom of the ejectors 300 are cables 312. The cables 312 run about guide pulleys 314 secured to the chassis 152. The guide pulleys 314 are tilted inwardly of the chassis at a slight angle as shown. Cables 316 are similarly secured to the bottom of the ejectors 302 and run about guide pulleys 318 mounted on the opposite side of the chassis.

Secured to the chassis 152 on each side thereof are bracket members 320 provided with sleeves 322 which act as guides for actuating rods 324 and 326. The rods 324 and 326 are movable back and forth in an axial direction relative to the sleeves 322. The cables 312 are attached to the rod 324 and the cables 316 are attached to the rod 326.

Positioned at the end of tracks 156 is a transversely extending vertical bumper 330. Pivotally attached to the bumper 330 are two arms 332 and 334. Attached to the ends of these arms are cables 336 and 338. These cables run up over pulleys 340 and 342 and are attached to suitable means (not shown) for selectively raising and lowering the arms. When one arm is lowered to a horizontal position the other is raised to an inclined position as shown. The arms when lowered to a horizontal position extend in the path of actuating rods 324 and 326.

Assuming now that the arm 334 is lowered as shown in Fig. 8, and that the vehicle is being drawn toward the bumper 330, the rod 326 will engage the arm 334 so as to be forced backward relative to the vehicle. As the rod 326 moves it exerts a pull on the cables 316, causing the latter to operate the ejector members 302. These members are rotated clockwise (Fig. 9) about the shaft 248. The arms 310 engage the log L and lift it up and off the vehicle onto a suitable platform 350. The arms 310 remain in raised position until the vehicle is backed away from the bumper 330, whereupon the ejector members 302 are free to return of their own weight to their at-rest position. The rod 326 is returned by the cables 316 to its original position.

In the event that it is desired to unload from the opposite side of the vehicle, the arm 332 of the bumper is lowered to horizontal position and the arm 334 is swung up to a position similar to that previously occupied by the arm 332. Thus when the vehicle is again drawn toward the bumper, the rod 324 will engage the arm 332 and will be forced rearwardly relative to the vehicle to operate the ejector members 300. This causes the log on the vehicle to be unloaded in the direction opposite from that illustrated in Fig. 9.

Since the motor 262 is reversible it is possible to drive the rolls 250 and 254 either clockwise or counterclockwise. The choice is determined by the position of the unloading platform. If the platform is located as shown in Fig. 9 so that the ejector members 302 must be used to unload the logs, the motor must be set to drive the rolls 250 and 254 in the direction opposite to the direction of rotation of the ejector members as the latter are moved upwardly by the cables 316. If this is done the direction of rotation of the logs will be such that when the ejector members 302 are operated, the logs will easily roll up and over the rollers 254 and onto the platform. If the platform is located on the other side of the vehicle so that the ejector members 300 are required to unload the logs, the motor 262 is set to run in the opposite direction. The motor 86 is operated so that the flail head and the log L will be rotated in the same clockwise or counter-clockwise direction (see Fig. 3). Thus the chains and the bark will be going in opposite directions at the point of contact with each other.

Preferably the various controls required to start and stop the motors, operate the fluid-pressure-responsive actuators, control movement of the vehicle, and change the positions of bumper arms 332 and 334, are all located in a control stand or booth located to one side of the platform 2 above the underground enclosure which houses the apparatus for moving the vehicle. The upper or handle end of the lever 194 extends up through the floor of the control booth so as to be within reach of the operator.

The control stand protects the operator from the weather as well as from the chips of bark that are removed from the logs. This allows the machine to be operated in all kinds of weather.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

I claim:

1. A flail head for a debarking machine comprising a rotatable shaft, a plurality of rubber plates mounted on said shaft in coaxial relation therewith, each of said plates having a slot in one of its edges, a plurality of chains, each chain having an end link positioned in the slot of one of said plates, a plurality of rods extending through said plates, each rod extending through said end links of certain of said chains whereby to pivotally attach said chains to said plates, and means at each end of said rods for maintaining said plates together as a compact unit on said shaft.

2. A flail head for a debarking machine comprising a rotatable shaft, a plurality of resilient plates each mounted on said shaft in coaxial relation therewith, certain of said plates having a pair of diametrically opposed edge slots, others of said plates also having a pair of diametrically opposed edge slots, said other plates being oriented so that their slots are angularly displaced from the slots of said certain plates, a plurality of chains, each chain having an end link positioned in one of said slots, a plurality of rods extending through said plurality of plates, each end link having one of said rods extending therethrough whereby said chains are pivotally attached to said plates, and means holding said plates together as a compact unit on said shaft.

References Cited in the file of this patent

UNITED STATES PATENTS

| | | |
|---|---|---|
| 1,337,286 | Stadig | Apr. 20, 1920 |
| 1,552,498 | Noyes | Sept. 8, 1925 |
| 1,969,914 | Swigert | Aug. 14, 1934 |
| 2,436,555 | Daniell | Feb. 24, 1948 |
| 2,601,261 | Carpenter | June 24, 1952 |
| 2,652,867 | Boswell | Sept. 22, 1953 |
| 2,671,480 | Efurd et al. | Mar. 9, 1954 |
| 2,675,035 | Carpenter | Apr. 13, 1954 |
| 2,689,591 | Woodard | Sept. 21, 1954 |
| 2,733,742 | Bedard | Feb. 7, 1956 |
| 2,795,320 | Dillingham | June 11, 1957 |
| 2,800,155 | Foreman | July 23, 1957 |